3,463,654
COPYING PROCESSES
Abraham Games, London, England, assignor to Imagic Limited, London, England, a British company
No Drawing. Filed Dec. 24, 1963, Ser. No. 333,182
Claims priority, application Great Britain, Dec. 31, 1962, 49,105/62
Int. Cl. B41c *1/06*; B41m *3/00*
U.S. Cl. 117—21                                          13 Claims

ABSTRACT OF THE DISCLOSURE

A copying process for producing a right reading image from an original image by heating a vaporizing agent so that it penetrates an opaque copy sheet so that the right reading image is formed on the upper surface of the copy sheet. The image may either be latent or visible.

---

My copending application Ser. No. 6,546, filed Feb. 3, 1960, describes a method of producing a copy of an original design in which an image is formed on a copy sheet by the evaporation of a vaporising agent over areas representative of the original design and its condensation on the copy sheet. In the simplest version of this process the evaporation occurs from the surface bearing the design and as a result the image formed on the copy sheet is basically a mirror image so that it is generally necessary for the copy sheet to be translucent so that the image can be viewed from the other side of the sheet. An image right-way-round can be produced by a single stage process if the sheet bearing the original design carries the design on one side only and is translucent to infrared radiation so that the evaporation can be produced from the rear surface of this sheet.

According to the present invention the mirror image produced by evaporation of the vaporizing agent from the surface bearing the original design is formed on the underside of an opaque copy sheet and this image is caused to penetrate or to be rendered visible through the copy sheet to give a right-way-round image on the top side of the sheet. In other words a right-way-round image is produced on an opaque sheet from either an opaque or double-sided original without the need for any additional step of offset or transfer.

The image which is caused to penetrate or to be rendered visible through the copy sheet may be either a latent image or a visible image. If a latent image is caused to penetrate the copy sheet it may then be developed on the top side of the sheet in the usual way, for example, as described in the specification referred to above. Most simply the penetration is achieved by the use of a porous copy sheet through which the latent image is found to permeate, to a sufficient extent to permit development on the top side, without the need for any additional action. Such porous sheets are necessarily thin and although useful in some applications are not normally suitable for office copying. When using sheets which are more widely acceptable further steps may be necessary to assist penetration. In any case whether the latent image or the developed image penetrates the copy sheet it is important that the latter should allow the passage of radiant energy for irradiating the original since in the majority of cases it will be necessary to bring about the evaporation of the vaporising agent by means of the selective absorption of radiant heat. Thus opaque tissue, sulphite, imitation parchment, bond, bank, airmail papers such as used for office work or typing carbon copies and many fabrics are suitable.

To assist the penetration of the latent image through the copy sheet the latent image may be modified, for example, by treatment with a colourless powder which may be a wax such as glyceryl monostearate or substances such as acetanilide, benzotriazole, beta-methyl-umbelliferone, pyrocatechin, pyrogallic or benzoic acids, among other materials which are effective to enhance penetration of the material comprising the latent image. This may be regarded as a preliminary step of development which nevertheless leaves the image in latent form but enables it to penetrate the copy sheet when activated for example by heat. The latent image on the top side of the sheet is then further developed to render it visible or otherwise usable as a right-way-round image.

As an alternative to modifying the latent image on the copy sheet the vaporizing agent used may include or consist of a material capable of penetrating the copy sheet. This material should be such as not to affect the surface bearing the original design but then allows the latent image to penetrate the copy sheet without further treatment. Some of the above mentioned materials, for example, benzoic acid or pyrogallic acid may be used for this purpose.

If a visible image is to penetrate the copy sheet the developing agent should generally include a dye or pigment and may also include a penetrant. For example an ink formulated by acetanilide and a powdered mixture of natural resin and dye sold under the trademark Hexalac Black 61738 by L. J. Pointing Ltd. in approximately equal proportions, but capable of regulation according to paper weight and thickness, is found suitable fo ra variety of copy substances. The penetrating action then occurs during thermal fixing of the developing agent which results in melting of the penetrant and of the fusible constituent if one is included. This carries the coloration through the sheet at least sufficiently to enable the image to be visible from the top side. Some developing agents are capable of penetrating the copy sheet without the necessity for added dye. Alternatively the top side of the copy sheet may be treated with a dye solvent which assists penetration by drawing the dye through the sheet. Thus if the dye is methyl violet this is effectively drawn through the sheet by the action of a solvent such as methylated spirits. If a water soluble dye is used in the developing agent the top side of the copy sheet may be treated with moisture or steam. Yet again the developing agent may include a constituent capable of reacting with a second substance to produce a visible image. In this event the top side of the copy sheet is treated with the second substance so as to give a visible image on the top side of the sheet. For example, if the developing agent is pyrogallic acid treatment of the top side of the sheet with an alkaline solution produces a reaction leading to a visible image on the top side.

A similar effect may be obtained by rendering the copy sheet transparent over areas corresponding to the image so that the image is rendered effectively visible from the top side of the sheet. For this purpose the latent image needs to be treated with a developing agent which includes a transparentiser, the fixing of the image then rendering the copy sheet transparent over the required areas. For this purpose the developing agent may include a powdered wax such as glyceryl monostearate, Acrawax C (an atomized wax of 5 micron particle size, melting point 140° C. approximately), Carnauba wax, pyrocatechin or similar gum or resin. Fluids such as oils incorporated in the ink achieve the same effect. The fixing of such a developing agent is usually carried out by heat but it may also be achieved by solvent or vapor.

After the latent image has been treated with a powdered developing agent an offset may be taken from the developed image either prior to or simultaneously with the fixing of the latter. In this way two separate right-way-round copies may be obtained. In several of the methods described the image may be finally visible on both sides of the copy sheet. In some applications, such as when copying on to fabrics, such a double sided image is of commercial importance, but if only a single sided image is required the underside of the copy sheet may have an opaque backing applied to it, for example, by laminating the copy sheet with a second backing sheet or by the application of an opaque layer or coating.

The following are examples of processes in accordance with the invention:

EXAMPLE 1

A mirror latent image is obtained on a sheet of porous, long fibered paper commercially referred to as stencil or lens paper. This is supplied by James Crompton, Bury, Lancashire, and is of 9 GMS. The top side or side remote from the mirror image is developed with a normal ink (i.e. according to the basic process of the aforesaid application) and fused by heat. The image is right way reading.

EXAMPLE 2

A mirror latent image is obtained on a bond paper of 12 lb. weight. Exposure is normally longer than for translucent papers since the bond paper is opaque. The latent image is treated with pyrocatechin reduced to a powder of approximately 20 microns and subjected to heat so that the pyrocatechin melts but does not vaporize. The top side of the paper is then treated with a normal ink which adheres to the latent image. The sheet is heated to fuse the image and at the same time the pyrocatechin evaporates so as to leave the underside of the sheet clear.

EXAMPLE 3

An ink is formulated from 1 part of a spirit solvent dye in powdered form supplied by L. J. Pointing Ltd. under the trademark Hexalac 65747 and seven parts of Acrawax C. The two are vibrated together until fully integrated. A mirror latent image is obtained on a bond paper of 15 lb. weight and is treated with the ink. The sheet is subjected to heat so as to fuse the ink at which the image appears as right way reading on the top side of the sheet.

EXAMPLE 4

A mirror latent image is obtained on a bond paper of 15 lb. weight and is treated with 2,4-dinitroaniline (in the form a yellow vaporizable powder) which constitutes a developing agent without additional dye or pigment. On subjection to heat a right way reading image in yellow appears on the top side of the sheet.

I claim:

1. A process for producing a right reading image coreponding to an original image which comprises: placing an original having a vaporizing agent at image areas there of in adjacency with the under surface of an opaque copy sheet having an upper and an under surface: vaporizing said vaporizing agent from said image areas to transfer said vaporizing agent to the under surface of said opaque copy sheet to form a mirror image of said original image on the under surface of said opaque copy sheet, said mirror image comprising said vaporizing agent; and heating said copy sheet to cause at least a component of said mirror image to penetrate through said opaque copy sheet from the under surface thereof to the upper surface thereof to provide said right-reading image corresponding to said original image at said upper surface, said right-reading image comprising said component of said mirror image.

2. A process according to claim 1 wherein said mirror image is a latent image.

3. A process according to claim 1 wherein, prior to heating, said mirror image comprising said vaporizing agent is treated with a material capable of assisting penetration of said vaporizing agent through said copy sheet.

4. A method according to claim 3 wherein said material is selected from the group consisting of glyceryl monostearate, acetanilide, benzotriazole, beta-methyl-umbelliferone, pyrocatechin, pyrogallic acid and benzoic acid.

5. A process according to claim 1 wherein said right reading image is a latent image and including the further step of developing said latent image.

6. A process according to claim 1 wherein said original image is on one side of a sheet, the other side of said sheet also being provided with image areas.

7. A process according to claim 1 wherein said mirror image includes a material capable of rendering said copy sheet transparent and wherein said material penetrates said copy sheet.

8. A process according to claim 1 wherein said mirror image comprises a first reagent capable of reacting with a second reagent to form a visible image, said first reagent being caused to penetrate said copy sheet, and wherein the upper surface of said copy sheet is provided with said second reagent, a visible right reading copy of said original being thus produced upon reaction of said first and second reagents at the upper surface of said copy sheet.

9. A process for producing a right reading image corresponding to an original image which comprises: placing an original having a vaporizing agent at image areas thereof in adjacency with the under surface of an opaque copy sheet having an upper and an under surface, said vaporizing agent being capable of penetrating said copy sheet; vaporizing said vaporizing agent from said image areas to transfer said vaporizing agent to the under surface of said opaque copy sheet to form a mirror image of said original image on the under surface of said opaque copy sheet, said mirror image comprising said vaporizing agent; permitting vaporizing agent of said mirror image to penetrate through said opaque copy sheet from the under surface thereof to the upper surface thereof to provide said right-reading image corresponding to said original image at said upper surface, said right-reading image comprising vaporizing agent of said mirror image.

10. A method according to claim 9 in which said mirror image is a latent image.

11. A method according to claim 10 wherein said upper surface is treated with a colored powder to provide a visible right reading developed copy of said original thereon.

12. A process for producing a right reading image corresponding to an original image which comprises: placing an original having a vaporizing agent at image areas thereof in adjacency with the under surface of an opaque copy sheet having an upper and an under surface; vaporizing said vaporizing agent from said image areas to transfer said vaporizing agent to the under surface of said opaque copy sheet to form a mirror image of said original image on the under surface of said opaque copy sheet, said mirror image comprising said vaporizing agent; and treating the upper surface of said copy sheet with a solvent for at least a component of said mirror image to move said component through said opaque copy sheet from the under surface thereof to the upper surface thereof to provide said right reading image corresponding to said original image at said upper surface, said right reading image comprising said component of said mirror image.

13. A process according to claim 12 wherein said mirror image is heated to assist in moving said component through said copy sheet.

References Cited

UNITED STATES PATENTS

| | | | |
|---|---|---|---|
| 2,295,028 | 9/1942 | Collins | 156—76 |
| 2,692,553 | 10/1954 | Metzner | 101—131 |
| 3,121,650 | 2/1964 | Meissner | 156—240 |
| 3,260,612 | 7/1966 | Dulmage et al. | 117—25 |
| 3,262,386 | 7/1966 | Gordon | 101—149.4 |
| 3,280,735 | 10/1966 | Clark et al. | 101—149.2 |
| 3,020,171 | 2/1962 | Bakan et al. | 117—36.2 |

FOREIGN PATENTS

60/431 3/1961 Republic of South Africa.

EARL M. BERGERT, Primary Examiner

J. D. SMITH, Assistant Examiner

U.S. Cl. X.R.

117—36.1, 36.2, 37